(12) United States Patent
Smith-Haddon et al.

(10) Patent No.: US 6,197,192 B1
(45) Date of Patent: Mar. 6, 2001

(54) FILTER ARRAY WITH CONNECTOR FOR SUCCESSIVE BACKWASH

(75) Inventors: William Frederick Smith-Haddon, Chepstow; Thomas Damian Cross, Bath, both of (GB); Robert Francis Campbell, Tempe, AZ (US)

(73) Assignee: Cross Manufacturing Company, Bath (GB)

(*) Notice: Subject to any disclaimer, the term of this patent is extended or adjusted under 35 U.S.C. 154(b) by 0 days.

(21) Appl. No.: 09/171,267
(22) PCT Filed: Apr. 11, 1997
(86) PCT No.: PCT/GB97/01003
  § 371 Date: Oct. 15, 1998
  § 102(e) Date: Oct. 15, 1998
(87) PCT Pub. No.: WO97/38778
  PCT Pub. Date: Oct. 23, 1997

(30) Foreign Application Priority Data

Apr. 16, 1996 (GB) .................................................. 9607858

(51) Int. Cl.[7] .................................................. B01D 35/16
(52) U.S. Cl. .................. 210/232; 210/333.1; 210/340; 210/426; 210/427; 137/625.11
(58) Field of Search ..................................... 210/108, 253, 210/232, 333.01, 333.1, 425, 426, 427, 340; 137/625.46, 876, 625.11

(56) References Cited

U.S. PATENT DOCUMENTS

| | | |
|---|---|---|
| 4,256,583 * | 3/1981 | Lennartz . |
| 4,430,220 * | 2/1984 | Litzenburger . |
| 4,781,825 | 11/1988 | Grimes et al. . |
| 5,030,347 * | 7/1991 | Drori . |
| 5,335,692 * | 8/1994 | Hobson et al. . |
| 5,341,834 * | 8/1994 | Doherty et al. . |
| 5,401,397 | 3/1995 | Moorehead . |

FOREIGN PATENT DOCUMENTS

| | | |
|---|---|---|
| 12 66 726 | 4/1968 | (DE) . |
| 32 09 216 | 9/1983 | (DE) . |
| 2 142 898 | 2/1973 | (FR) . |
| 1 026 803 | 4/1966 | (GB) . |
| 2 045 102 | 10/1980 | (GB) . |

* cited by examiner

Primary Examiner—W. L. Walker
Assistant Examiner—Terry K. Cecil
(74) Attorney, Agent, or Firm—King and Schickli, PLLC

(57) ABSTRACT

A filtration apparatus includes an array of filters arranged in parallel about a rotatable assembly 24 for successively backwashing each of the filter elements 19 within the array. The rotatable assembly includes a connector bachwash shoe 26 and a cage having an annular circlip 33 supporting a valve element 31 therein. During normal filtration, water flows up the inlet tube 11, through a respective opening 17 into filtration chamber 13, and then through a respective filter element. The filtrate flows upwardly into plenum 16 and out through outlet 14. In a backwashing mode, the assembly 24 is rotated by a moving means that includes shaft 22 driven by a stepper motor 34 such that the valve element is radially unseated out of the backwash outlet 30. Each filter element is then backwashed in turn as an L-shaped passage 27 of the bachwash shoe is aligned with a respective opening 17 allowing backwash fluid to flow out opening 28a to the backwash outlet. At the end of the backwash cycle, the valve element is reseated into the backwash outlet.

12 Claims, 2 Drawing Sheets

FILTER ARRAY WITH CONNECTOR FOR SUCCESSIVE BACKWASH

TECHNICAL FIELD

This invention relates to filtration apparatus and in particular, but not exclusively, to apparatus for filtering high volumes of liquids such as water.

BACKGROUND OF THE INVENTION

As the cleanliness of water in supplies for drinking and manufacturing and in installations such as air-conditioning apparatus, become more and more important, a need has developed for a compact, easily serviceable filter apparatus. Further currently there is no satisfactory backwashable filter that can readily be used in remote locations where there is no power supply. At least some embodiments of the present invention mitigate these various problems.

SUMMARY OF THE INVENTION

From one aspect there is provided filtration apparatus comprising an array of filters arranged in parallel and having respective inlets and outlets, a backwash outlet, a connector for successively connecting the filter inlets to the backwash outlet and means for moving the connector from inlet to inlet in a cycle characterised in that the moving means carries a valve element for closing the backwash outlet and that the moving means physically unseats the valve element at the start of the cycle and allows it reseat at the end of the cycle.

The valve element may be mounted in a cage and carried around with the moving means as it moves the connector from inlet to inlet. In this case the valve element, which is preferably a ball, is unseated at the start of the cycle by camming against a camming surface.

DETAILED DESCRIPTION OF THE INVENTION

The inlets are preferably arranged in a circle and the moving means rotates intermittently through the cycle about the axis of the circle. The moving means may include an electric stepper motor. Preferably the motor and its controls require a low voltage power source such as a 12v car battery.

Conveniently the connector, which can be in the form of an L-shaped pipe, and the valve element rotate about a common axis.

The outlets may debouch into a common chamber, which may be partially defined by a lid to allow simultaneous and immediate access to the filters. The filters may be mounted in a common support such that they can be removed together or singularly.

The filters may be supported in generally cylindrical chambers and the inlets may be tangentially inclined to the chambers.

Although the invention has been defined above it is to be understood that it includes any inventive combination of the features set out above or in the following description.

Figure 1:
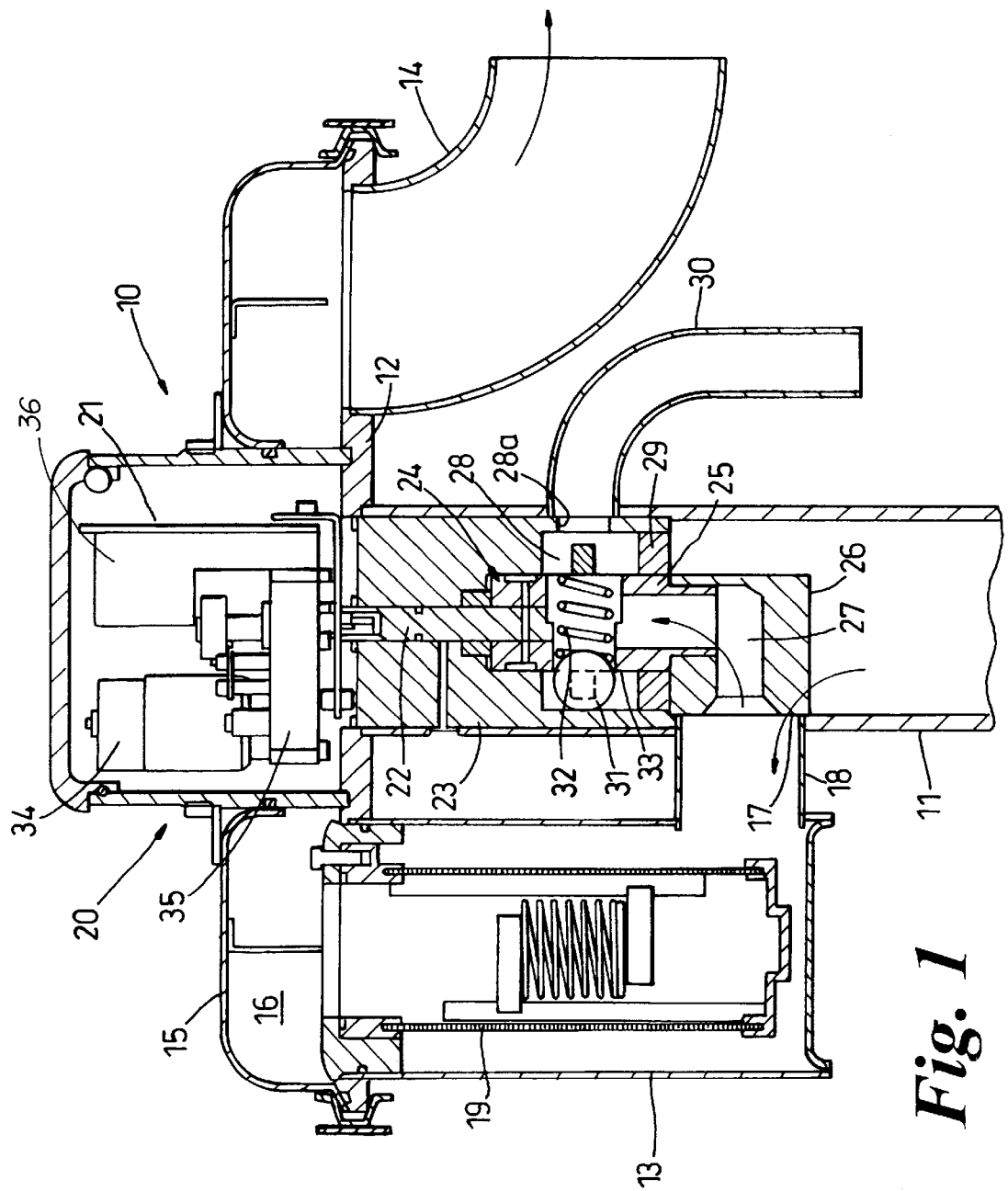
FIG. 1 is a vertical cross-section of an embodiment of the invention taken along the line I—I of FIG. 2.
Figure 2:
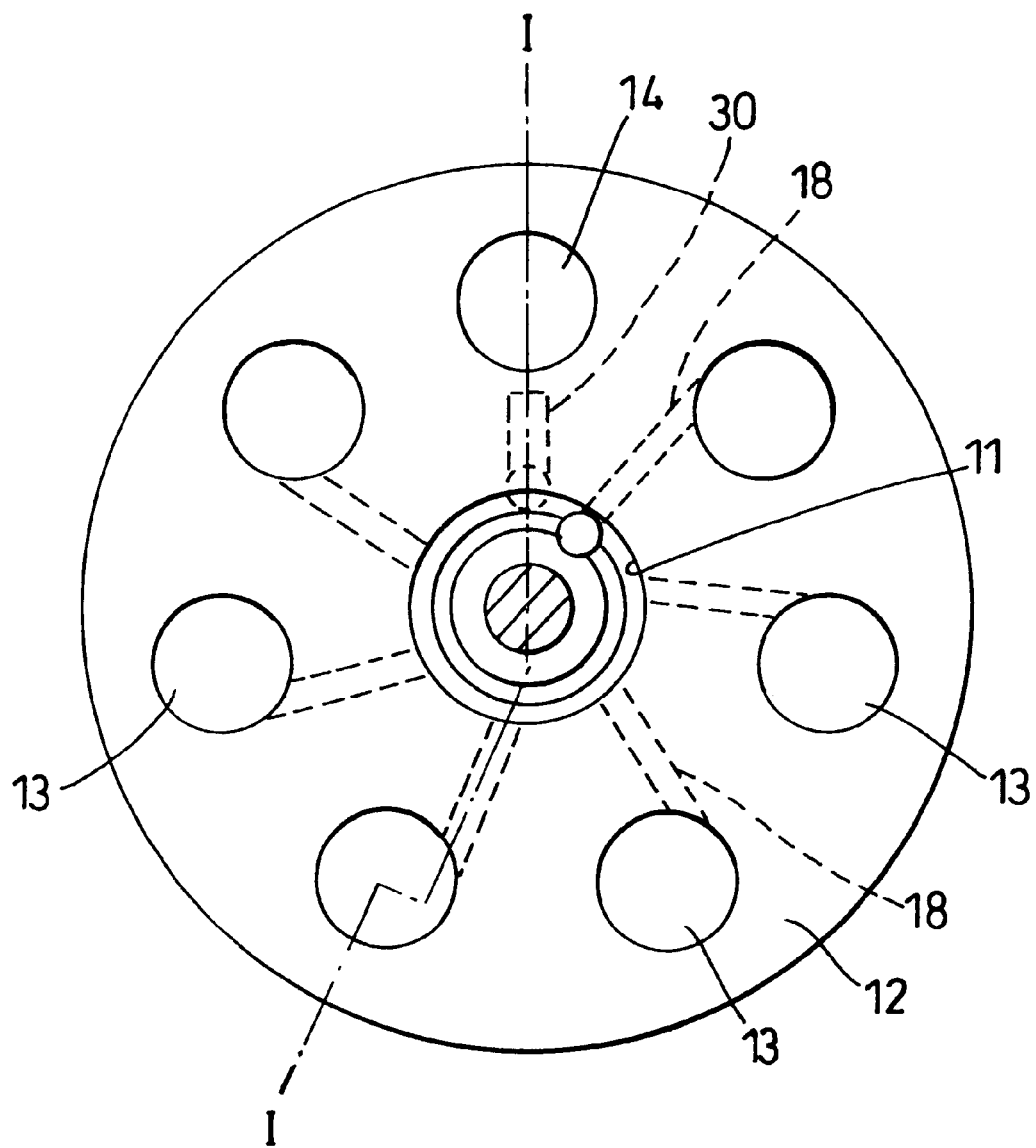
FIG. 2 is a horizontal cross-section of an embodiment of the invention.

The invention may be performed in various ways and a specific embodiment will now be described with reference to FIG. 1 which is a vertical cross-section along the line I—I (FIG. 2) of the filtration apparatus in its backwash mode.

Filtration apparatus is generally indicated at 10 and includes a central inlet tube 11, which supports an annular plate 12, from which a number of filtration chambers 13 and an outlet 14 are suspended. The plate 12 also carries a lid 15 which serves to form a plenum 16 by which the filter chambers 13 are connected to the outlet 14. The filter chambers 13 are mounted around the inlet tube 11 and are connected to lateral opening 17 in the inlet tube by means of tangential pipes 18. Each chamber 13 contains a filtration element 19, such as that described in European Patent No. 0 487 598. In normal use, water flows up the inlet tube 11 through the respective opening 17 into pipes 18 which debouch into the filtration chambers 13 in a tangential fashion so that a turbo-style flow is set up in the chamber enhancing filtration. The water then flows through the respective filters 19, upwardly out into the plenum 16 and thence out of the outlet 14. It will be understood that the filters are therefore acting in parallel and the concentric arrangement of them with the filter pipe provides an extremely compact arrangement, whilst giving a very large filter area and throughflow.

As in all cases, it is desirable from time to time to backwash these filters. Suitable backwash equipment is generally indicated at 20. This comprises a control assembly 21, including a motor 34 and gearbox 35, which drive a shaft 22 that extends downwardly into the inlet tube 11. The shaft is located by a fixed bush 23 and supports a rotatable assembly 24.

The assembly 24 comprises a hollow shaft element 25 from which depends a backwash shoe 26 so that the shaft 25 and shoe 26 form an L-shaped passage 27. This passage debouches into a chamber 28, which is isolated from the inlet portion of the tube 11 by a further bush 29. The chamber 28 can communicate with a backwash outlet 30, fixed in the wall of the tube 11, via an opening 28a.

Also contained within the chamber 28, and forming part of the assembly 24, is a ball 31, which can seat, through the opening 28a, in the mouth of the backwash outlet 30 to close it and is urged into this position by a spring 32. The ball 31 is mounted in a cage. In a preferred embodiment of the present invention, the cage comprises an annular circlip 33. The ball 31 is retained between the ends of an annular circlip 33, which is mounted on the hollow shaft 25 for rotation therewith, and which maintains the ball 31 at a fixed position relative to the hollow shaft 25.

In use, during normal filtration, the ball 31 is located in the backwash outlet 30 and seals it to prevent any leakage of system water into the backwash. The shoe 26 sits in a position in which it is at least not fully aligned with any opening 17. When it is desired to backwash any part of the filter, the shaft 22 is rotated to align the shoe 26 successively with each of the openings 17, there being a sufficient dwell period at each opening to allow the respective filter 19 to be fully backwashed. As this stepped rotation begins the circlip 33 forces the ball 31 to cam out of opening 28a, thereby unsealing backwash outlet 30. As the rotatable assembly 24 is rotated, circlip 33 forces the ball 31 to progressively roll around the wall of the inlet tube 11 until a complete circuit is finished, at which time the spring 32 forces the ball 31 into opening 28a, thereby resealing backwash outlet 30. Thus, whenever the shoe 26 aligns with an opening 17, the backwash fluid can flow up the L-shaped passage into the chamber 28 and thence out through the opening 28a and the backwash outlet 30 to drain carrying all the filtered debris with it.

The simplicity of this assembly has a number of advantages. First there are no remotely-controlled valves, such as solenoid valves, and this considerably reduces the need for maintenance and the power consumption of the system. Secondly the compact and lightweight backwash assembly 24 allows the apparatus to be driven by a relatively small motor and with correspondingly simple controls. It is therefore possible to run the apparatus from a 12v vehicle battery and so the whole filter can be located at some remote part of a water supply system without the need to lay expensive power lines. This is particularly advantageous where some temporary cleaning operation is needed, but it also can allow long-term filtration to occur with the battery simply being replaced every month or so.

The maintenance of the filter is further simplified by its common removable lid 15 which exposes all of the filters 19 simultaneously and allows them to be replaced individually, without any of the other filters being removed or disassembled. Alternatively, all of the filters can be lifted out together with the plate 12 and a substitute module inserted. Once again both of these features are particularly important where the filter is located away from normal workshop facilities.

What is claimed is:

1. A filtration apparatus comprising an array of filters arranged in parallel about an axis and having respective inlets and outlets, a central connector for successively connecting the filter inlets to a backwash outlet and means for moving the connector from inlet to inlet in a backwash cycle characterized in that the moving means carries a cage, said cage including a valve element mounted therein for closing the backwash outlet wherein by movement of the cage the moving means physically and radially unseats the valve element at the start of the backwash cycle to move the valve element circumferentially about said axis along an inner periphery of the array and allows the valve element to radially reseat at the end of the backwash cycle.

2. Apparatus as claimed in claim 1, wherein the cage comprises an annular circlip with the valve element being retained between the ends of the circlip.

3. Apparatus as claimed in claim 2, wherein the moving means includes a stepper motor.

4. Apparatus as claimed in claim 3 wherein the motor and any associated controls are powered by a D.C. battery.

5. Apparatus as claimed in claim 1 wherein the connector and valve element rotate about a common axis.

6. Apparatus as claimed in claim 5, wherein the array is circular and is concentric with the moving means.

7. Apparatus as claimed in claim 1 wherein the outlets debouch into a common chamber.

8. Apparatus as claim 7, wherein the chamber is partially defined by a lid to allow simultaneous access to the filter.

9. Apparatus as claimed in claim 8, wherein the filters are mounted in a common support and can be removed together or singularly.

10. Apparatus as claimed in claim 1, wherein the filters are supported in generally cylindrical chambers and the inlets are tangentially inclined to the chamber.

11. Apparatus as claimed in claim 1, wherein the valve element is a ball.

12. Apparatus as claimed in claim 1, wherein the inlets are arranged on a circle and the moving means rotates intermittently through the cycle.

* * * * *